United States Patent
Taylor et al.

(10) Patent No.: US 10,698,220 B1
(45) Date of Patent: Jun. 30, 2020

(54) DYNAMIC FRUSTRATED TOTAL INTERNAL REFLECTION COUPLER

(71) Applicant: Facebook Technologies, LLC, Menlo Park, CA (US)

(72) Inventors: Byron Taylor, Redmond, WA (US); Sharvil Shailesh Talati, Seattle, WA (US)

(73) Assignee: Facebook Technologies, LLC, Menlo Park, CA (US)

( * ) Notice: Subject to any disclaimer, the term of this patent is extended or adjusted under 35 U.S.C. 154(b) by 183 days.

(21) Appl. No.: 15/987,882

(22) Filed: May 23, 2018

(51) Int. Cl.
*G02B 27/01* (2006.01)
*G02B 27/00* (2006.01)
*G02B 27/42* (2006.01)

(52) U.S. Cl.
CPC ..... *G02B 27/0172* (2013.01); *G02B 27/0018* (2013.01); *G02B 27/4205* (2013.01); *G02B 2027/012* (2013.01); *G02B 2027/0178* (2013.01)

(58) Field of Classification Search
CPC ............ G02B 27/0172; G02B 27/0018; G02B 27/4205; G02B 2027/0178; G02B 2027/012
See application file for complete search history.

(56) References Cited

U.S. PATENT DOCUMENTS

| | | | | |
|---|---|---|---|---|
| 8,026,997 | B2* | 9/2011 | Feng | G02B 6/005 349/65 |
| 9,523,852 | B1* | 12/2016 | Brown | G02B 27/0101 |
| 2010/0278479 | A1* | 11/2010 | Bratkovski | G02B 6/12007 385/31 |
| 2013/0107164 | A1* | 5/2013 | Verslegers | G02B 6/0065 349/61 |
| 2016/0070113 | A1* | 3/2016 | Travis | G02F 1/1323 349/18 |

OTHER PUBLICATIONS

Tran, T.Q. et al., "Tunable Wide-Angle Tunneling in Graphene-Assisted Frustrated Total Internal Reflection," Scientific Reports, Jan. 27, 2016, pp. 1-9.

\* cited by examiner

*Primary Examiner* — Jade R Chwasz
(74) *Attorney, Agent, or Firm* — Fenwick & West LLP

(57) ABSTRACT

A waveguide display is used for presenting media to a user. The waveguide display is part of a Near Eye Device (NED), and an output of the waveguide display is a light field directed to a user's eye that extends across the surface of an exit pupil. Light traveling in total internal reflection (TIR) is selectively interrupted through frustrated total internal reflection (FTIR). FTIR coupling between waveguides produces multiple expansions of an input light field. The coupling locations of FTIR are dynamic, allowing for adjustment of the location and size of the exit pupil.

16 Claims, 8 Drawing Sheets

DYNAMIC FRUSTRATED TOTAL INTERNAL REFLECTION COUPLER

BACKGROUND

The present disclosure relates generally to near-eye-display (NED) systems, and more specifically to light field expansions that increase a size of an exit pupil of the NED.

Near-eye light field displays project images directly into a user's eye. Conventional NEDs generally include a small input beam that generates a source light field that is ultimately conveyed to a user's eye. The exit pupil of the NED is the virtual aperture of the NED surface through which the light field can be out-coupled to the user's eye. NEDs used in artificial reality systems (e.g. virtual reality (VR), augmented reality (AR), mixed reality (MR) systems or some combination and/or derivatives thereof) ideally have a large exit pupil. A large exit pupil allows users with variable interpupillary distance (IPD) to view images displayed in the NED without requiring a custom build of the NED hardware for each user. Additionally, the larger exit pupil accommodates eye rotation as a user views virtual objects in an artificial reality environment displayed by the NED. Because the input beam is typically much smaller than a desired exit pupil size, the input beam is expanded within the NED before being out-coupled to the user's eye.

Conventional techniques of exit pupil expansion (EPE) involve replicating the input beam and out-coupling the replications across the desired exit pupil. However, these conventional EPE solutions often lack luminance uniformity, since it is difficult to precisely out-couple the same flux of light across the entire eye box, as well as suffer from power inefficiency, since coupling efficiency is often sacrificed to provide uniform flux across the exit pupil. A main limitation is that conventional EPE solutions are static design solutions, resulting in specific, hardwired configurations of couplers and expansions within the NED that are not able to dynamically respond to a user, thus limiting the design and capabilities of the NED.

SUMMARY

A light field propagating in total internal reflection (TIR) is contained in a medium. At the medium's boundary, the incident light field in TIR does not produce a significant transmitted field and is instead substantially or entirely reflected within the medium. Thus the light field can propagate within the medium in TIR with minimal and in some cases no loss of energy. TIR can be selectively interrupted through frustrated total internal reflection (FTIR). FTIR can locally out-couple the light field in TIR into a second medium. FTIR is highly energy efficient, as most, and in some cases all of the light field propagating in the first medium can be transferred to the second medium. The location of FTIR coupling can be dynamically selected, allowing the transfer of a light field between mediums at variable locations.

Dynamic FTIR coupling can be used to replace conventional EPE solutions. FTIR coupling between waveguides in an NED expands a small input light field across the NED, and outputs light to a user's eye, providing a power efficient exit pupil whose location and size can be selected via the variable locations of FTIR.

A waveguide display is configured to couple light between waveguides with FTIR. The waveguide display includes a first waveguide having a first surface and a second surface that is opposite the first surface. An input coupler in-couples light into the first waveguide. The first waveguide expands the light in a first dimension to form first expanded light. A second waveguide has a third surface and a fourth surface that is opposite the third surface. The second waveguide in-couples the first expanded light at a first adjustable contact point between the second surface of the first waveguide and the third surface of the second waveguide. The first adjustable contact point frustrates total internal reflection of light in the first waveguide to transfer to first expanded light to the second waveguide. The second waveguide expands the first expanded light in a second dimension to form image light that it output by the second waveguide.

In some embodiments, the waveguide display has an additional output coupler, and two adjustable contact points. A third expanded light outputs to a user's eye, forming an exit pupil. The waveguide display may be included in an NED, such as an artificial reality NED, and the image light may provide visual media to a user of the NED.

DETAILED DESCRIPTION OF THE DRAWINGS

Figure 1:
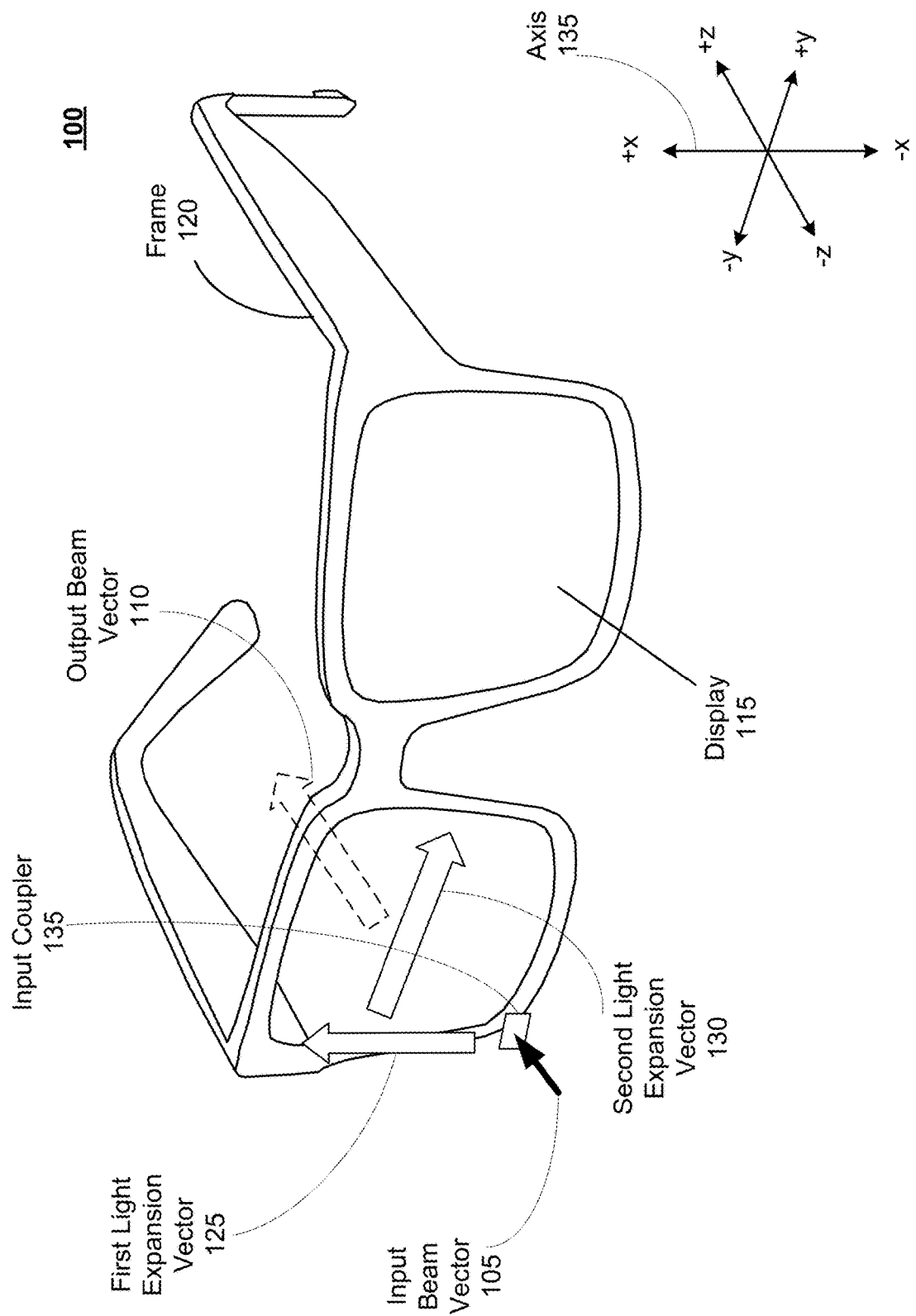
FIG. 1 is a graphical representation of light field expansion across a NED device, in accordance with one or more embodiments.

NEDs used for artificial reality systems direct a light field to a user's eye to provide virtual visual content to the user. The light field typically originates from the output beam of a projector. In most cases, the output beam is small, and is expanded in order to provide a light field over the full area of a user's pupil. The virtual aperture of an NED across which light out-couples to a user's eye is the NED's exit pupil. If a user's eye is located at an exit pupil of the NED, the user has full field of view (FOV) of the image displayed on the NED. However, users inevitably have variable IPD, meaning distance between the center of his or her pupils. In order to provide a variety of users with full FOV without having to customize the hardware of the NED, the exit pupil should be large enough to accommodate biological variations in IPD.

Conventional solutions for expanding the exit pupil involve making multiple copies of the input beam through EPE and outputting the copies to the user's eye over a surface area of the NED corresponding to a desired exit pupil size. This may be accomplished through a variety of existing techniques, such as using output couplers that output a portion of a light beam from a waveguide along the surface of the NED. However, EPE techniques often lack luminance uniformity because they are unable to provide the same output flux across the entire exit pupil, as portions of the output coupler are located at different distances from the source input beam. As the beam is out-coupled from one end of the output coupling to the other, the total power within the waveguide gradually reduces. To produce uniform output flux over the exit pupil, the efficiency of the output couplers is lower closer to the input light source and higher further away. Thus power efficiency is often sacrificed in order to provide uniform flux over the exit pupil. EPE techniques also often exhibit wavelength dependencies, causing color variations and adding to efficiency loss, since the output coupler can't necessarily be optimized for a specific wavelength, and instead needs to handle the full visible light spectrum.

A main limitation that underlies conventional EPE solutions is that they are static design solutions, resulting in specific, hardwired configurations of couplers and expansions within the NED that are not able to dynamically respond to a user, thus limiting the capabilities of the NED. For example, in EPE, the light field location and output to the user cannot be guided via a power source or controller, and instead depend on the physical, hardwired design of the NED.

Dynamically frustrating TIR, and using this technique to expand the input light across an exit pupil dramatically increases the power efficiency of the NED, enables power control of the light field, allows for variable focal length distance, and opens up the possibility for eye-box steering based on eye gaze direction. Dynamic FTIR can replace EPE techniques and light field replication. In some cases, dynamic FTIR can provide one-dimensional (1D) or two-dimensional (2D) light beam expansion across the NED.

In TIR, the incident electromagnetic wave propagates through a material of refractive index $n_i$ and encounters a boundary with a material of refractive index $n_t$, where $n_i > n_t$. At a critical angle of incidence on the boundary, the refractive wave does not significantly propagate through the second material of lower refractive index. This means that each reflection has the potential to be lossless, and the energy of the incident wave can be largely contained within the first material. As long as the material in which the light propagates continues to have a higher refractive index than the second material outside the boundary, the light wave can propagate for long distances in TIR. Propagating a light wave through a waveguide of an NED in TIR is thus useful because it allows the light field to travel through the NED with minimal loss of power.

TIR can be selectively "frustrated," meaning that at a select location of the material through which a light field is propagating, TIR can be interrupted, and the light wave out-coupled to the second material. FTIR results from the phenomenon of a non-propagating, evanescent field that forms in the second, lower refractive index material. The evanescent field forms at the boundary of the two materials, and decays exponentially in the lower refractive index material away from the boundary. Under TIR conditions, the evanescent field does not significantly transmit net energy across the boundary due to exponential decay. The equation giving the depth penetration of the evanescent field into the lower refractive index material is shown below:

$$d = \frac{\lambda_0}{4\pi}(n_i^2 \sin^2\theta_i - n_t^2)^{-1/2} \quad (1)$$

where $\lambda_o$ is the wavelength of the incident wave, $n_i$ is the refractive index of the first material, $n_t$ is the refractive index of the second material beyond the boundary (in which the evanescent field forms), $\theta_i$ is the angle of incidence at which the incident wave hits the boundary, and for TIR, $n_t < n_i$. In an example, the incident light propagates in TIR in the material of a waveguide of the NED, which may be glass, or any other high index material. In some examples, the waveguide may have a refractive index in a range from ~1.5-1.9. The incident light wave is at an angle greater than a critical angle, and reflects off of the boundary of the waveguide material. On the other side of the boundary is an air gap. The refractive index of air (~1.0) is lower than the material of the waveguide, so the light wave continues to reflect in TIR in the waveguide at the same angle. However, if a second material of the same refractive index is brought within the penetration distance of the evanescent field d as shown in Equation 1, then at that particular location along the waveguide, the light wave is transmitted from the first material to the second material through the evanescent field. The distance of the air gap between the first and second material effectively functions as a potential barrier, and if the second material is close enough, the light field "tunnels" across the gap into the second material. As described herein, a contact point between two materials refers to any distance between a first material and a second material in which the evanescent field transfers the light field from the first material to the second material. Thus a contact point refers to at least a maximum distance between the two materials in which the potential barrier of the air gap may be overcome. In some examples, the contact point refers to a distance between materials less than or equal to d as described in Equation 1. In some examples, a contact point refers to a literal point of contact, in which the distance between materials is 0. In some examples, the contact point refers to a distance greater than 0 and less than or equal to d. In some examples in which a range of wavelengths propagate in TIR, the contact point refers to a distance d defined by the propagating light of minimum wavelength, such that $\lambda_o$ is the light of minimum wavelength. Using a distance d determined by the minimum wavelength improves the tunneling efficiency between materials. In examples in which a range of wavelengths propagate in TIR, the maximum penetration depth of the evanescent field is defined by the maximum wavelength of the propagating light field, however to improve tunneling efficiency, the contact point may be a distance between 0 and the maximum penetration depth d.

Selectively frustrating TIR as it propagates in the waveguide thus allows for energy efficient transfer of light between materials at a particular, controllable location of the waveguide. The locations of FTIR can be dynamically adjusted, such as in response to the direction of a user's gaze.

Selectively frustrating TIR can also improve energy efficiency by tailoring the size and location of the exit pupil and eyebox to a user. In conventional EPE techniques, the size and location of an exit pupil and eyebox are static, determined by the specific design of the EPE system. Thus to accommodate user eye movement, or variable IPD, conventional EPE techniques often over-estimate the size and location of the exit pupil, resulting in a higher power load on the NED to provide the larger light field. In contrast, the dynamic nature of FTIR allows the exit pupil location to track a user's gaze, and the specific location of a user's pupil. For example, when FTIR is used with an eye tracking system, the size and location of the exit pupil and eyebox can be adjusted to the location of a user's eye and the direction of the user's gaze by scanning a corresponding location of FTIR. The location of FTIR can be scanned fast enough that a user's eye will integrate the output light into a single image, producing an output image that is directed to a user's pupil. The precision delivery of the light field to a user's pupil allows for further increases in power efficiency, since only light necessary for filling a user's pupil can be output. Further embodiments of FTIR as used in NEDs are described in greater detail below.

Embodiments of the invention may include or be implemented in conjunction with an artificial reality system. Artificial reality is a form of reality that has been adjusted in some manner before presentation to a user, which may include, e.g., a virtual reality (VR), an augmented reality (AR), a mixed reality (MR), a hybrid reality, or some combination and/or derivatives thereof. Artificial reality content may include completely generated content or generated content combined with captured (e.g., real-world) content. The artificial reality content may include video, audio, haptic feedback, or some combination thereof, and any of which may be presented in a single channel or in multiple channels (such as stereo video that produces a three-dimensional effect to the viewer). Additionally, in some embodiments, artificial reality may also be associated with applications, products, accessories, services, or some combination thereof, that are used to, e.g., create content in an artificial reality and/or are otherwise used in (e.g., perform activities in) an artificial reality. The artificial reality system that provides the artificial reality content may be implemented on various platforms, including a head-mounted display (HMD) connected to a host computer system, a standalone HMD, a mobile device or computing system, or any other hardware platform capable of providing artificial reality content to one or more viewer.

FIG. 1 is a graphical representation of light field expansion across a NED 100, in accordance with one or more embodiments. The NED 100 includes a light field source that provides an input beam, which is input into the display assembly through an input coupler 135 along the direction of the input beam vector 105. The input beam vector 105 then undergoes three different expansions before being output to a user's eye (not shown) in an output beam vector 110, which is shown as being perpendicular to the display 115, but may be at any angle relative to the display 115 surface.

The NED 100 presents media to a user to create an artificial reality environment. Media presented by the NED 100 may include one or more images, video, audio, or some combination thereof. In some embodiments, audio is presented via an external device (e.g., speakers and/or headphones) that receives audio information from the NED 100, a console (not shown), or both, and presents audio data based on the audio information. As an artificial reality device, the NED 100 may be configured to operate as an AR, VR, MR device and/or any combination thereof. For example, in some embodiments, the NED 100 may augment views of a physical, real-world environment with computer-generated elements (e.g., images, video, sound, etc.). In examples in which the NED 100 augments existing views of the real-world environment, the display 115 may be transparent, allowing the viewer to see through the display 115 to the real-world environment while simultaneously providing artificial views of computer-generated visual media.

The NED 100 shown in FIG. 1 includes a frame 120 and a display 115. The frame 120 is coupled to one or more optical elements which together display media to users. In some embodiments, the frame 120 may represent a frame of eye-wear glasses. The display 115 is configured for users to see the content presented by the NED 100. As discussed below in FIG. 2, the display 115 includes at least one waveguide display assembly (not shown) for directing one or more image light to an eye of the user. The NED 100 includes a light source that generates a light field, which is then coupled into a waveguide through the input coupler 135 to produce input beam vector 105. The light source is located on the NED 100. The waveguide display assembly may be in any of the configurations described in further detail with reference to FIG. 3-8.

In some embodiments, the NED 100 further includes an eye tracking system (not shown) for tracking a position of one or both eyes of a user. Note that information about the position of the eye includes information about an orientation of the eye, i.e., information about the direction of the user's eye-gaze. Information about the position of the eye may include the focal length distance of the user's gaze, and/or a convergence distance of a user's eyes. Based on the position of the user's eye, the NED 100 adjusts image light emitted from one or both of the display assemblies. Additionally or alternatively, the NED 100 adjusts the coupling location between different waveguides by changing the location of FTIR. This is described in further detail with reference to FIG. 2-8. In some embodiments, the eyewear device 100 adjusts focus of the image light through the display 115 and ensures that the image light is in focus at the determined angle of eye-gaze in order to mitigate the vergence-accommodation conflict (VAC). Additionally or alternatively, the NED 100 adjusts resolution of the image light by performing foveated rendering of the image light, based on the position of the eye. Additionally or alternatively, the NED 100 uses the information on a gaze position and orientation to provide contextual awareness for the user's attention, whether on real or virtual content. The eye tracker generally includes an illumination source and an imaging device (camera). The illumination source of the eye tracker may be any output-coupled light from the display 115, such as the output beam 110. In some embodiments, components of the eye tracker are integrated into the display 115. In alternate embodiments, components of the eye tracker are integrated into the frame 120. Additional details regarding incorporation of eye tracking system and eyewear devices may be found at, e.g., U.S. patent application Ser. No. 15/644,203, which is hereby incorporated by reference in its entirety. Computation for the eye-tracking system may be carried out by a processor located in the NED 100, in a processor located on a coupled device, such as a and/or a coupled mobile device, as described in further detail with reference to FIG. 6.

As shown in FIG. 1, the input beam vector 105 is coupled into the display 115 of the NED 100 in the +z direction by an input coupler 135, perpendicular to the surface of the display 115. Depending on the light source, the input beam vector 105 may be at any angle to the display 115, but will have a vector component in the z axis. In some embodiments, a light source is generated by a projector located on the NED 100 that outputs a light field (not shown). In some embodiments, the light source is generated from an LED light source, such as a light source array. The light source array may be scanned to produce image light. The light source array may be one-dimensional or two-dimensional. In other embodiments, the light source is generated from any visible light source. As shown in FIG. 1, there is a single input beam vector 105, however in other embodiments there may be more than one input beam vector 105 coupled to a waveguide from a light source that provide source light at different locations of the NED 100. The light source is described in further detail with reference to FIG. 2.

The input beam vector 105 undergoes a reflection within the NED 100 that results in the first light expansion vector 125. As shown in FIG. 1, the first light expansion vector 125 is in the +x direction. The first light expansion vector 125 thus expands light in a first dimension, along the outer edge of the display 115, which sits in the x-y plane. Expanding the light along first light expansion vector 125 provides a way to spread the light wave across a first dimension of the 2-D surface of the display 115. In some examples, the first light expansion vector 125 travels through a waveguide, which is described in further detail with reference to FIG. 2-8.

The second light expansion vector 130 expands the light from the first light expansion vector 125 in a second dimension. The second light expansion vector propagates across the surface of the display 115 within the x-y plane, and has a component in the +y direction. As shown in FIG. 1, the second light expansion vector is perpendicular to the first light expansion vector 125, however in other embodiments, the second light expansion vector 130 may propagate at any angle to the first light expansion vector 125. A coupler along the length of the first light expansion vector 125 may bend the first light expansion vector 125 at a right angle to form the second light expansion vector 130. The second light expansion vector 130 travels through a waveguide, which may be a part of the display 115, and constitute a planar surface. The waveguide is described in further detail with reference to FIG. 2-8.

Finally, the output beam 110 is out-coupled from the second light expansion vector 130 in a third dimension. As shown in FIG. 1, the output beam 110 is in the +z direction, and is out-coupled perpendicular to the surface of display 115 and second light expansion vector 130. In some examples, the output beam 110 may be out-coupled at an angle to the user's eye (not shown). The angle at which output beam 110 is out-coupled may be a function of the user's focal length distance, as determined by an eye-tracking assembly located on the NED 100.

In one example, the coupling between the first light expansion vector 125 and the second light expansion vector 130 may be FTIR coupling. The first light expansion vector 125 may thus propagate in a first material in TIR. The location along the first light expansion vector 125 at which the light field is transferred to the second light expansion vector 130 is determined by dynamic FTIR. The second light expansion vector 130 may then propagate in TIR. FTIR coupling between the first light expansion vector 125 and the second light expansion vector 130 constitutes a 1-D FTIR coupling. FTIR coupling between the first light expansion vector 125 and the second light expansion vector 130 may replace conventional EPE techniques. An example of a 1-D FTIR coupling is described in further detail with reference to FIG. 3A-6.

In one example, the coupling between the second light expansion vector 130 and the output beam 110 may be FTIR coupling. The second light expansion vector 130 may thus propagate in a material in TIR across the surface of the display 115 in the +y direction. A second, output coupling material parallel to the surface in which the second light expansion vector 130 propagates (i.e. parallel to the x-y plane as shown in FIG. 1) may be added to the NED and display 115 in order to provide a surface for FTIR coupling between the second light expansion vector 130 and the output beam 110. An example of an output coupling surface is described in further detail with reference to FIG. 7-8. The location along the second light expansion vector 130 at which the light field is transferred to the output beam 110 is determined by the location at which the potential barrier is low enough that the evanescent field transfers the light field between them. FTIR coupling between the second light expansion vector 130 and the output beam 110 constitutes a 1-D FTIR coupling. This 1-D FTIR coupling between the second light expansion vector 130 and the output beam 110 may be used with the 1-D FTIR coupling between the first light expansion vector 125 and the second light expansion vector 130 to create 2-D FTIR coupling. This 2-D FTIR coupling can replace conventional EPE techniques. An example of 2-D coupling is described in further detail with reference to FIG. 3A-4 and FIG. 7-8.

The location of the output beam 110 in relation to the surface of the display 115, as well as the angle at which it propagates can be determined by the locations of FTIR coupling between the first light expansion vector 125 and second light expansion vector 130, and/or the FTIR coupling between the second light expansion vector 130 and the output beam 110. In 1-D FTIR coupling, the third light expansion vector may have a fixed y location and a variable x location. In 1-D FTIR coupling, the third light expansion vector may have a fixed x location and a variable y location. In 2-D FTIR coupling, the third light expansion vector has a variable y location and a variable x location. Using FTIR coupling improves the energy efficiency of the transfer of the input beam vector 105 to the output beam 110.

Figure 2:
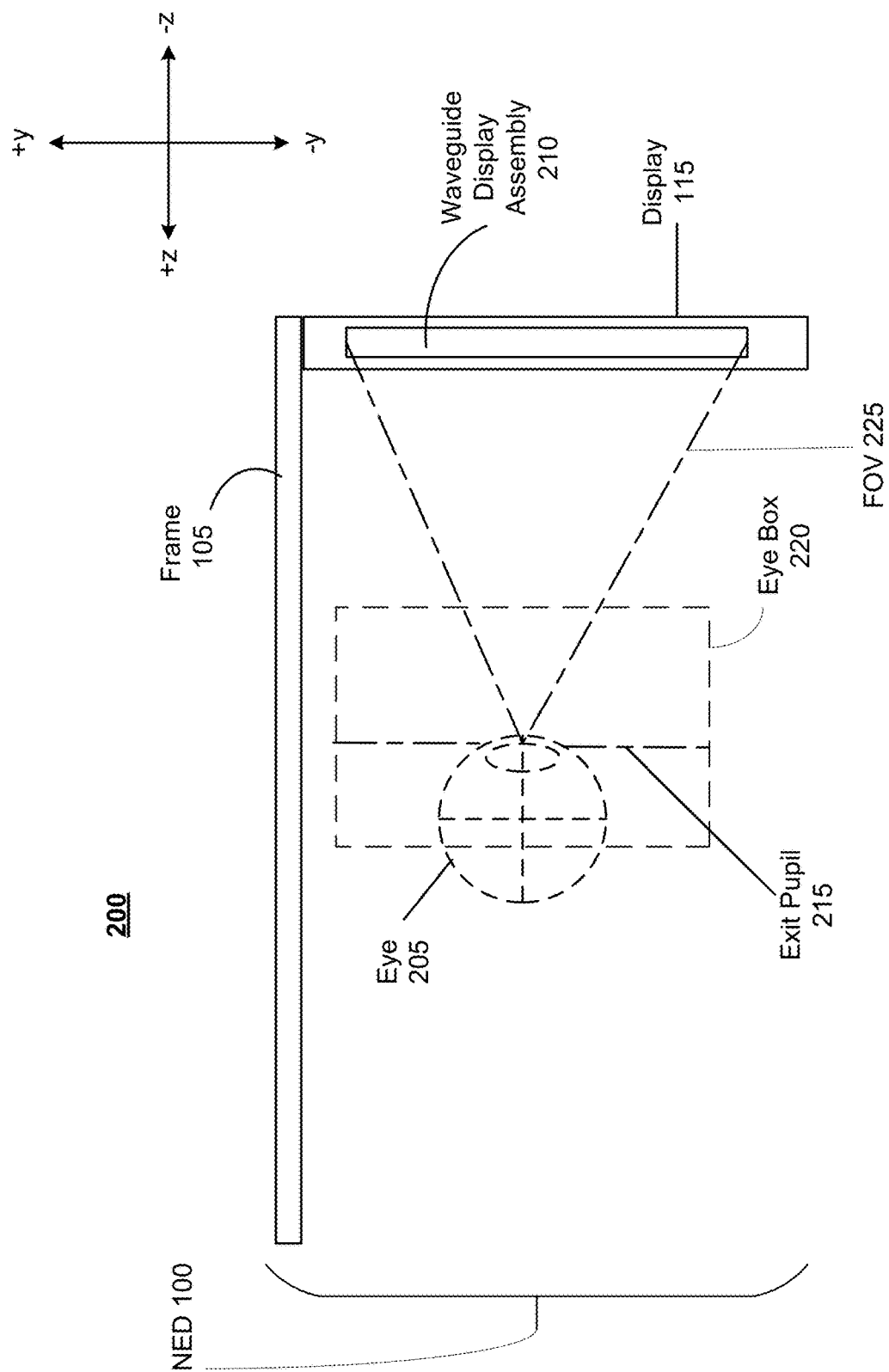
FIG. 2 is a cross sectional overhead view of the NED of FIG. 1, in accordance with one or more embodiments.
Figure 3:
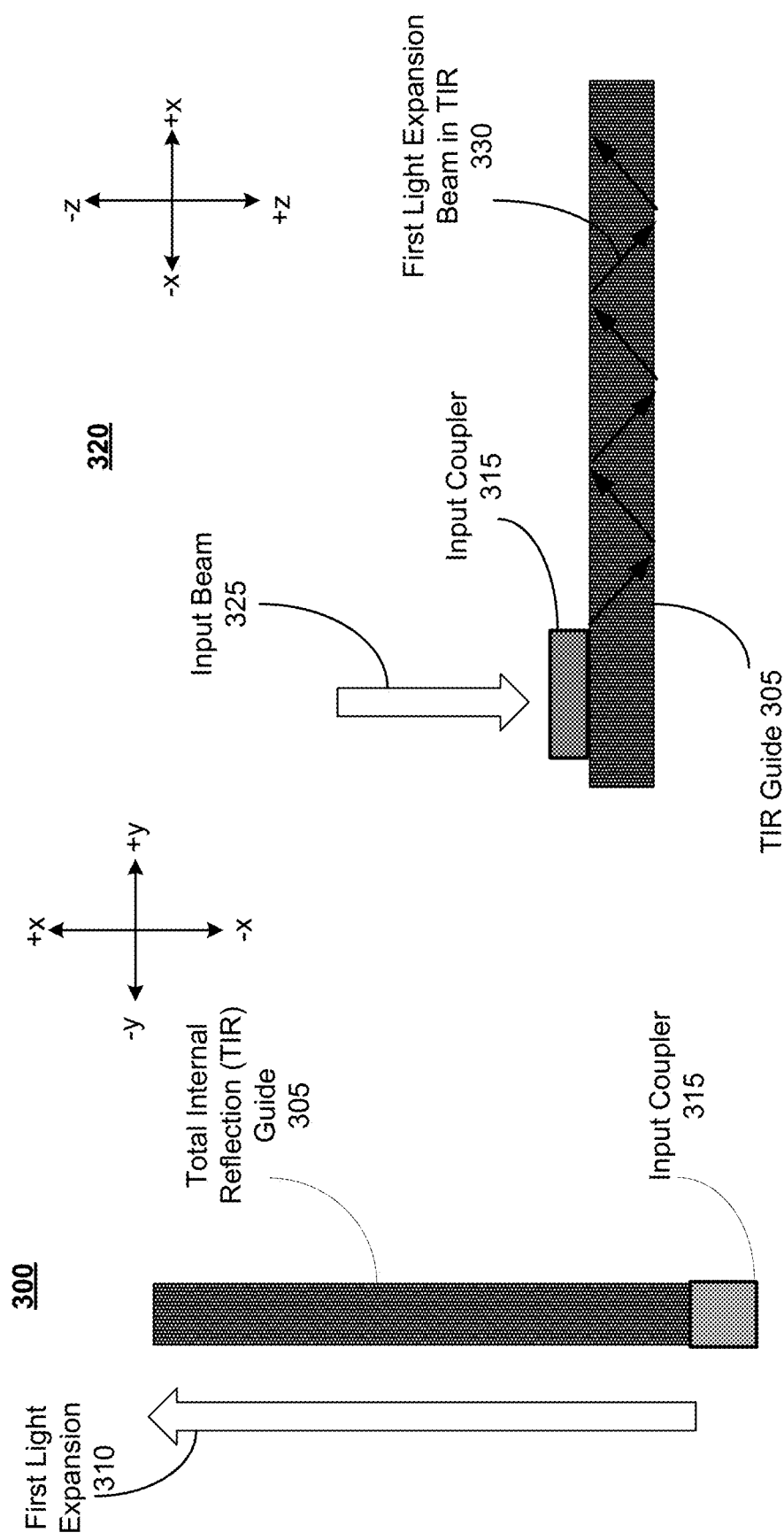
FIG. 3A is a front view of a TIR guide and a first light expansion, in accordance with one or more embodiments.
FIG. 3B is a side view of the TIR guide and first light expansion illustrated in FIG. 3B, in accordance with one or more embodiments.

FIG. 2 is a cross sectional overhead view 200 of the NED 100 of FIG. 1, in accordance with one or more embodiments. The display 115 includes at least one display assembly 210. An exit pupil 215 is ideally a location where the eye 205 is positioned when the user wears the NED 100. For purposes of illustration, FIG. 2 shows the cross section 200 associated with a single eye 205 and a single display assembly 210, but in alternative embodiments not shown, another waveguide display assembly which is separate from the waveguide display assembly 210 shown in FIG. 2, provides image light to another eye 205 of the user.

The display assembly 210, as illustrated below in FIG. 2, is configured to direct the image light to the eye 205 through the exit pupil 215. An eye box 220 is the 3-dimensional area occupied by the output light field emanating from the waveguide display assembly 210. The eye box 220 is thus a projection of the 2-dimensional exit pupil 215 surface along the z-axis, as shown in FIG. 2. The display assembly 210 may be composed of one or more materials (e.g., plastic, glass, etc.) with one or more refractive indices that effectively minimize the weight and widen the FOV 225 of the NED 100. In alternate configurations, the NED 100 includes one or more optical elements between the display assembly 210 and the eye 205. The optical elements may act to, e.g., correct aberrations in image light emitted from the display assembly 210, magnify image light emitted from the display assembly 210, some other optical adjustment of image light emitted from the display assembly 210, or some combination thereof. The example for optical elements may include an aperture, a Fresnel lens, a convex lens, a concave lens, a filter, or any other suitable optical element that affects image light.

The display assembly 210 includes the waveguides for the light field expansions shown in FIG. 1. Thus the waveguide display assembly 210 may include a projector for producing the input beam vector 105. The first light expansion vector 125 and second light expansion vector 130 may propagate within the waveguide display assembly 210 before being out-coupled to the user's eye 205 to fill the exit pupil 215. The output beam 110 thus produces the exit pupil 215 as shown in FIG. 2. As described below, FIG. 3A-8 show various embodiments for producing the output beam 110 and exit pupil 215.

In some embodiments, the display assembly 210 includes a stack of one or more waveguide displays. Light of different wavelength ranges may propagate in separate waveguides in the waveguide stack. For example, red light (wavelengths ~620-750 nm) may propagate in a first waveguide, while blue light (wavelengths ~450-495 nm) may propagate in a second waveguide. In embodiments in which light of different wavelength ranges propagates in separate waveguides, the light may be independently out-coupled from the separate waveguides by any of the embodiments described in FIGS. 3A-8. Thus each of the separate waveguides may have a separate and independently controllable out-coupling configuration for producing the output vector 110. In some examples, light of different wavelength ranges may propagate in a single waveguide and be out-coupled as the third light expansion vector by a single out-coupler, which may be any of the configurations described below in FIGS. 3A-8. In some examples, light of different wavelength ranges may propagate in a single waveguide, but be out-coupled by separate out-couplers, which may be any of the configurations described below in FIGS. 3A-8. For example, red light may be out-coupled by a first out-coupler, while blue light may be out-coupled by a second out-coupler, while the red light and the blue light propagate together in the same waveguide. In some examples, light of different wavelength ranges may be time-multiplexed and out-coupled as the output vector 110 by a single out-coupler using any standard time-multiplexing technique.

FIG. 3A is a front view 300 of a TIR guide 305 and a first light expansion 310, in accordance with one or more embodiments. The TIR guide 305 allows the first light expansion 310 to propagate in TIR. The first light expansion 310 corresponds to the first light expansion vector 125, as described in further detail with reference to FIG. 1. In some examples, the TIR guide 305 is located along an edge of the display 115 of NED 100. As shown in FIG. 3A, the first light expansion 310 is in the +x direction. In reference to FIG. 1, the first light expansion 310 may, in other embodiments, be in the +y direction, corresponding to a first light expansion vector 125 along the upper edge of the display 115. The front view 300 corresponds to a view of the TIR guide 305 in the NED that is perpendicular to the x-y plane, such that the input coupler 315 receives an light source from the input beam vector 105 in the +z direction and expands it in a first light expansion 310 in the plane of the display 115 in the +x direction, as shown in axis 135.

The input coupler 315 receives a light field from a light source located in proximity to the input coupler 315. In some examples, the light source is located on the display 115 of the NED 100 (not shown). Additionally or alternatively, the light source is located on the frame 120 of the NED 100. The source may be a laser diode, a vertical cavity surface emitting laser, a light emitting diode (LED), a microLED, an organic LED (OLED), a tunable laser, or any other light source that emits incoherent, partially coherent or coherent light. The source may be an array of emitters, a plurality of emitters, and/or a plurality of arrays. The light source may be scanned to form a two-dimensional image, such as by a scanning waveguide assembly (not shown). The light source emits wavelengths within the visible band of light (e.g. from 390 nm to 700 nm).

The light source may be monochrome, and the full color spectrum created by stacking a red, blue and green light source. In some examples, the light source emits a plurality of wavelengths, such as wavelengths corresponding to red, green and blue visible light. The light source may emit light that is continuous, pulsed, or otherwise turned ON and OFF in response to a controller.

Additional optical components may be included between the light source and the input coupler 315 that condition the source light before being input to the TIR guide 305. Conditioning light from a light source to the input coupler 315 may include collimating, adjusting orientation, or some other adjustment of the light. The one or more optical components may include, e.g., lenses, mirrors, apertures, gratings, or some combination thereof.

The input coupler 315 couples the output of a source of a light field to the TIR guide 305. The input coupler 315 is optically aligned with the source of the light field, as well as optically aligned with the TIR guide 305. The input coupler 315 changes the direction of the incoming light field to facilitate the propagation of the light field in the TIR guide 305 in the first light expansion 310. The input coupler 315 changes the direction of the input light field to ensure that as the light leaves the input coupler 315 and enters the TIR guide, the diffraction angle of the light exiting the input coupler is greater than a critical angle, such that each subsequent reflection of the light field within the TIR guide is in TIR. In some examples, the input coupler 315 is a grating that alters the direction of the input light field, and outputs light at a diffraction angle to the TIR guide that is greater than a critical angle. In some examples, the input coupler 315 is a prism coupler that outputs light at a diffraction angle greater than a critical angle. In some examples, the input coupler 315 may include lenses, mirrors, apertures, gratings, or any combination thereof.

The TIR guide 305 is a waveguide that propagates the source light received at the input coupler in a first light expansion 310. As shown in FIG. 3A, the first light expansion 310 is in the +x direction. First light expansion 310 corresponds to the first light expansion vector 125 as shown in FIG. 1. The TIR guide 305 may be located on an outer edge of display 115 of the NED 100. In other examples, the TIR guide 305 is located anywhere within the plane of the display 115, which in FIG. 1 is shown as the x-y plane. Multiple TIR guides 305 may be included in the NED 100.

The TIR guide 305 is formed from a material having a higher refractive index than any of the surfaces in which it is in direct contact, in order to maintain TIR of the light field within the TIR guide 305. For example, the TIR guide 305 may have a refractive index greater than that of air. The TIR guide 305 may be formed from a high refractive index material, such as a high refractive index plastic, glass, polymer, or any other suitable material. As shown in FIG. 3A, the TIR guide 305 is a rectangular waveguide. Alternatively, the TIR guide 305 is a planar or strip waveguide. The TIR guide 305 may have any geometry that allows for propagation of a light field in TIR in a first light expansion 310.

FIG. 3B is a side view 320 of the TIR guide 305 and first light expansion 310 illustrated in FIG. 3A. In accordance with one or more embodiments. The side view 320 shows the input beam 325 being directed into the input coupler 315.

The input beam 325 is generated by a light source in optical alignment with the input coupler 315, as described in further detail with reference to FIG. 3A. The input beam 325 corresponds to the input beam vector 105 as described in further detail with reference to FIG. 1. The side view 320 corresponds to an overhead view of the NED 100, such that the display 115 is within the x-y plane of the side view 320.

As shown in the side view 320, the input coupler 315 and TIR guide 305 expand the input beam 325 in the first light expansion beam in TIR 330 in the +x direction. This allows for the image light be distributed in a first dimension across the display 115, providing a first expansion of the small input beam 325 that can then be used to expand the exit pupil of the NED 100, as described in further detail below.

Figure 4:
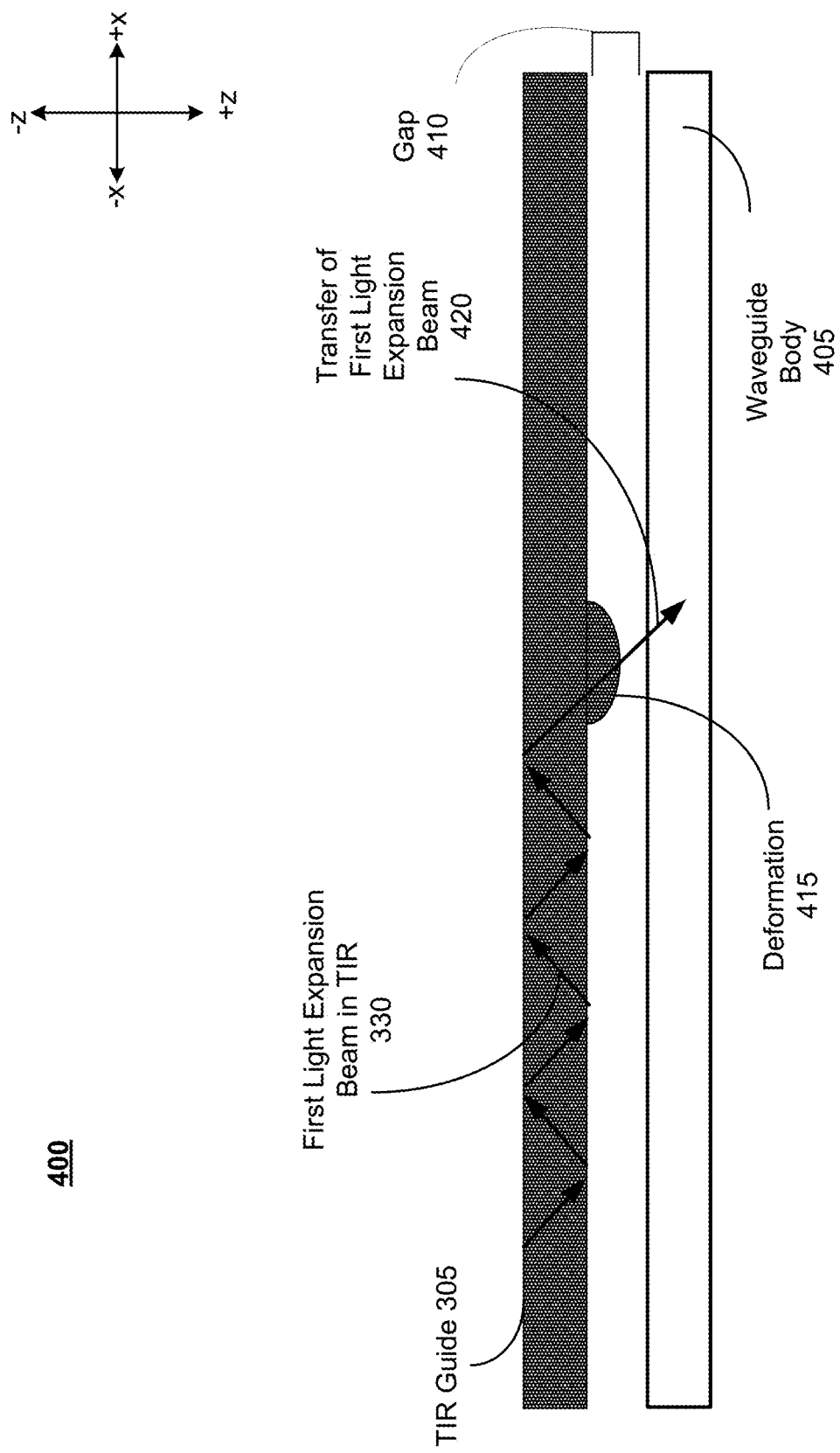
FIG. 4 is a side view of a first TIR guide coupling to a waveguide body via FTIR, in accordance with one or more embodiments.

FIG. 4 is a side view 400 of a first TIR guide 305 coupling to a waveguide body 405 via FTIR, in accordance with one or more embodiments. The side view 400 is the same orientation of the TIR guide 305 as shown in side view 300 of FIG. 3B. Thus side view 400 corresponds to an overhead view of the NED 100 as shown in FIG. 1. The TIR guide 305 and first light expansion beam in TIR 325 are described in further detail with reference to FIG. 3A and 3B.

The TIR guide 305 contains a first light expansion beam in TIR 330 which propagates in TIR in the +x direction as shown in FIG. 1. The first light expansion beam in TIR 330 propagates through the TIR guide 305 without significant loss of energy, since the light field is substantially or entirely contained within the TIR guide 305. The TIR guide 305 is parallel to a waveguide body 405. The relation between the TIR guide 305 and the waveguide body 405 is described in further detail with reference to FIG. 5-8.

The waveguide body 405 is a planar waveguide, extending in the x-y plane across the display 115 shown in FIG. 1. The waveguide body 405 is formed from a material having a higher refractive index than any of the surfaces in which it is in direct contact. For example, the waveguide body 405 may have a refractive index greater than that of air. The waveguide body 405 may be formed from a high refractive index material, such as a high refractive index plastic, glass, polymer, or any other suitable material. In some examples, the waveguide body 405 has the same refractive index as the refractive index of the TIR guide 305. In some examples, the waveguide body 405 has a single refractive index. Alternatively, the waveguide body 405 may have a gradient refractive index. In some examples, the waveguide body 405 has any geometry that allows for propagation of a light field in the direction of the second light expansion vector 130, and/or any other vector direction within the x-y plane of the display 115 as shown in FIG. 1.

A gap 410 is maintained between the TIR guide 305 and the waveguide body 405. The gap 410 has a refractive index that is lower than the TIR guide 305 and the waveguide body 405. The gap 410 allows the first light expansion beam in TIR 325 to propagate within the TIR guide 305, since it provides an interface with the TIR guide 305 of a lower refractive material. The gap 410 acts as a potential barrier that prevents the first light expansion beam in TIR 325 from exiting the TIR guide 305. In some examples, gap 410 is an air gap. In some examples, the gap is approximately 5μm. Alternatively, gap 410 is maintained by a material of lower refractive index than the TIR guide 305 and the waveguide body 405. As long as the gap 410 is maintained, the first light expansion beam in TIR 325 continues to propagate within the TIR guide 305 without significant loss of energy.

However, at deformation 415, the gap 410 is interrupted, causing a localized reduction in the space between the TIR guide 305 and the waveguide body 405. As described in relation to Equation 1, while the first light expansion beam in TIR 325 conveys a light field in a first light expansion 310 without significant loss of energy, there is a non-propagating evanescent field that develops at the material boundary of the TIR guide 305, and penetrates a depth d into the lower index of refraction material external to the TIR guide 305. The penetration depth d is shown in Equation 1. If the distance between the TIR guide 305 and the waveguide body 405 is reduced from the size of the gap 410 to be less than or equal to the penetration depth d of the evanescent field formed external to the TIR guide 305, then the first light expansion beam in TIR 325 is transferred by the evanescent field at deformation 415 from the TIR guide 305 to the waveguide body 405 through the transfer of first light expansion beam 420. The transfer of first light expansion beam 420 is thus FTIR since it interrupts the propagation of the light field in TIR and out-couples light into the waveguide body 405. In some examples, the deformation 415 physically contacts the waveguide body 405. In other examples, the deformation 415 reduces the distance between the TIR guide 305 and the waveguide body 405 to a distance greater than 0 and less than or equal to the distance d given by Equation 1. The contact point is a point along the TIR guide 305 at which the deformation 415 is formed and the first light expansion beam in TIR 325 is transferred to the waveguide body 405. As described herein, a contact point may have a diameter or lateral dimension approximately the same size as the width of an input beam produced by any of the light sources described herein. In some examples, the contact point may have a diameter of ~1.5 to 2.0 mm, which corresponds to an input beam having a diameter of ~1.5 to 2.0 mm. The contact point may refer to a physical contact between the TIR guide 305 and the waveguide body 405. In other examples, the contact point refers to the point along the TIR guide 305 at which the distance between the TIR guide 305 and the waveguide body 405 is reduced to be greater than 0 and less than or equal to the distance d given by Equation 1. In other examples, the contact point refers to the distance along the TIR guide 305 at which transfer of first light expansion beam 420 occurs.

As shown in FIG. 4, the deformation 415 is formed on the TIR guide 305. Additionally or alternatively, the deformation 415 may be formed on the waveguide body 405. For example, a deformation 415 may be formed both on the TIR guide 305 and the waveguide body 405, resulting in the transfer of first light expansion beam 420. In other examples, a deformation 415 may be formed only on the waveguide body 405, resulting in the transfer of first light expansion beam 420.

The transfer of first light expansion beam 420 through FTIR produced by the deformation 415 is highly energy efficient. If the TIR guide 305 has the same refractive index as the waveguide body 405, the transfer of first light expansion beam 420 may be 100% efficient. This means that all of the light field propagating in TIR in the TIR guide 305 is transferred to the waveguide body 405.

The deformation 415 for FTIR may be produced using a variety of techniques. In some examples, the deformation 415 is a physical deformation in the surface of the TIR guide 305 and/or the waveguide body 405. In other examples, the deformation 415 is a location at which the refractive index of the TIR guide 305 is effectively changed, such that the incident light within the TIR guide 305 no longer satisfies the conditions for TIR. Selectively and dynamically changing the refractive index of the TIR guide 305 may be accomplished using a variety of techniques. For example, the deformation 415 may be created using an acousto-optic modulator (AOM). In this example, the deformation 415 is not a physical deformation, but instead represents a location on the TIR guide 305 and/or the waveguide body 405 at which the refractive index has been effectively altered by the sound waves produced by the piezoelectric transducer of the AOM. In some examples of AOM FTIR, the deformation 415 and resulting transfer of first light expansion beam 420 occurs at periodic locations along the TIR guide 305 and/or waveguide body 405 corresponding to the period of the sound wave produced by the AOM. Thus a plurality of deformations 415 and a plurality of transfer of first light expansion beams 420 may occur along the TIR guide 305 and/or waveguide body 405. Alternatively, the AOM may produce a single deformation 415 and a single transfer of first light expansion beam 420.

In another example in which the deformation 415 is caused by selectively and dynamically changing the refractive index of the TIR guide 305, the TIR guide 305 itself may be formed from a material whose index of refraction can be made to change in response to an input, such as in plasmonic coupling. In some examples, a graphene layer may be formed on the TIR guide 305 opposite the waveguide body 405, and on the waveguide body 405 such that graphene layers are located on either side of the gap 410. Through a process called graphene assisted FTIR, an applied voltage alters the chemical potential of graphene, causing the index of refraction across the gap 410 to change and resulting in FTIR. This process is described in further detail in Tran Q., Thang., Lee, Sangjun., Heo, Hyungjun., and Kim, Sangin. "Tunable Wide-Angle Tunneling in Graphene-Assisted Frustrated Total Internal Reflection." *Scientific Reports*. Vol: 6. (2016) which is incorporated by reference herein. Selectively changing the refractive index of the TIR guide 305 may mean an addressable location of FTIR on the TIR guide 305, described in further detail with reference to FIG. 5.

In another example, the bottom surface of the TIR guide 305 facing the waveguide body 405 and in contact with the gap 410 includes a layer of an electro-statically charged liquid. Additionally or alternatively, the upper surface of the waveguide body 405 facing the TIR guide 305 and in contact with the gap 410 includes a layer of an electro-statically charged liquid. In this example, liquid that deforms in response to an applied voltage creates deformation 415, which does not change the shape of the TIR guide 305 and/or the waveguide body 405 itself. Rather, the deformation 415 is a droplet of electrostatically charged liquid that forms from the liquid's surface in response to an applied voltage. The deformation 415 of liquid reduces the gap between the TIR guide 305 and waveguide body 405, producing the transfer of first light expansion beam 420. In some examples, the deformation may be formed on the waveguide body 405. In some examples in which electrostatically charged liquid is located on the surface of both the TIR guide 305 and the waveguide body 405, the deformation 415 may be a capillary bridge between the two liquids, thus producing physical contact between the TIR guide 305 and the waveguide body 405 and reducing the gap 410 to a distance of 0.

Any other technique for producing FTIR and creating transfer of first light expansion beam 420 may be used. While FIG. 4 shows a single deformation 415 and a single transfer of first light expansion beam 420, a plurality of deformations 415 and a plurality of transfers of first light expansion beam 420 may be produced to form a second light expansion within the waveguide body 405, which is described in further detail with reference to FIG. 5.

Figure 5:
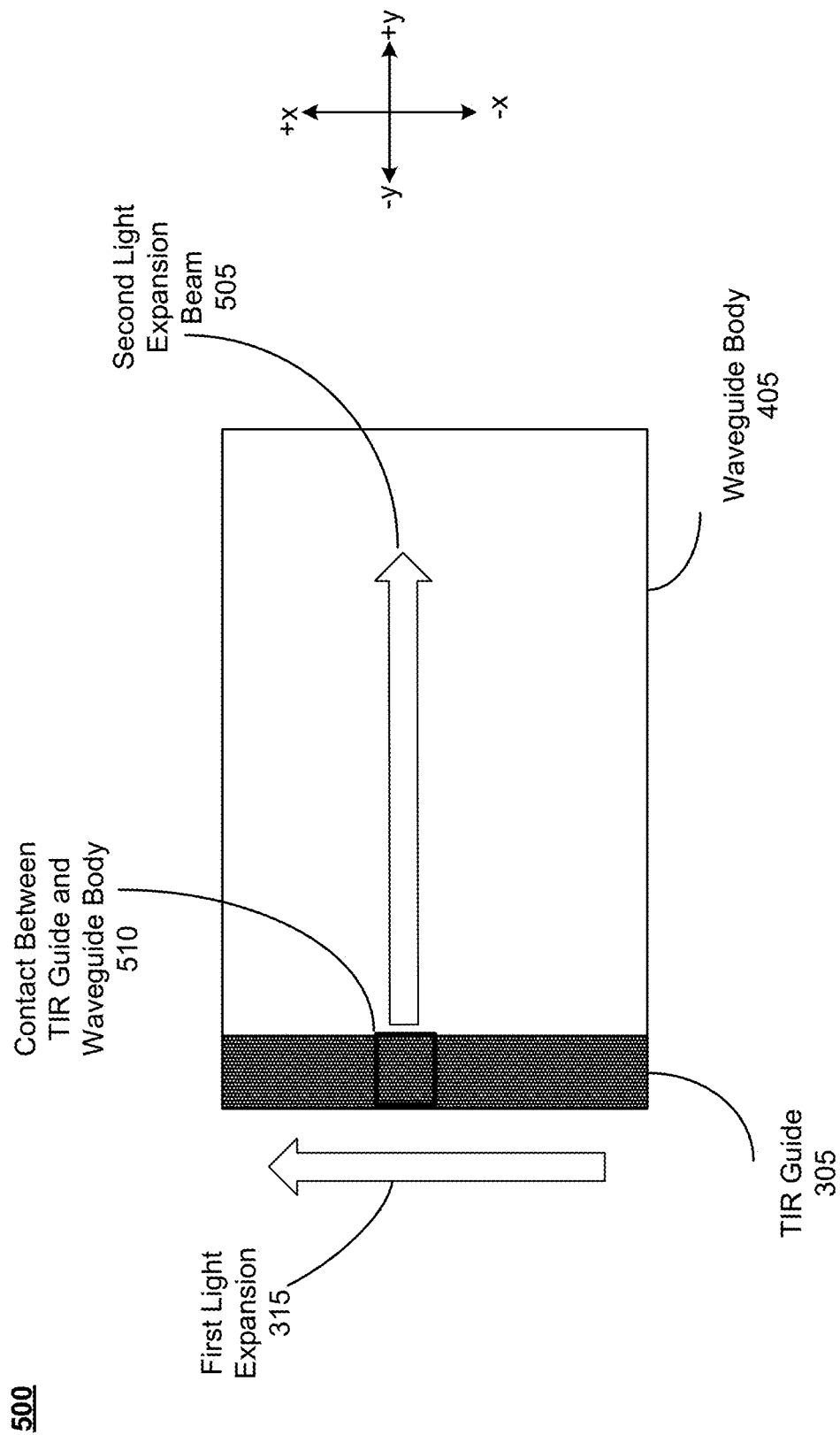
FIG. 5 is a front view of a first light expansion in a first waveguide and a second light expansion in the waveguide body, in accordance with one or more embodiments.

FIG. 5 is a front view 500 of a first light expansion 310 in a first waveguide 305 and a second light expansion 505 in the waveguide body 405, in accordance with one or more embodiments.

The front view 500 is a front view of the side view 400 as described in further detail with reference to FIG. 4. Thus the front view 500 shows the TIR guide 305 and the first light expansion 310 and waveguide body 405 from the +z direction, while the side view 400 shows the TIR guide 305 and waveguide body 405 from the +y direction. The second light expansion beam 505 is the result of the transfer of first light expansion beam 420 as described in further detail with reference to FIG. 4.

When the light field is out-coupled from TIR guide 305 into the waveguide body 405, the light field is bent via a grating (not shown) that alters the direction of the first light expansion 315 and expands light in the waveguide body 405 at a diffraction angle that is greater than a critical angle. The grating may be located on the TIR guide 305 and/or the waveguide body 405. In some examples, a prism coupler located on the TIR guide 305 and/or the waveguide body 405 bends the light field from the TIR guide 305 at a diffraction angle greater than a critical angle. Any other technique may be used to ensure that the second light expansion beam 505 expands in the +y direction in the waveguide body 405 in TIR.

Following the transfer of first light expansion beam 420 into the waveguide body 405, the transferred light field expands in a second light expansion beam 505 within the waveguide body 405 in the +y direction, as shown in FIG. 5. The transfer of the light field from the first light expansion 310 in the TIR guide 305 to the second light expansion beam 505 in the waveguide body 405 is a 1-D FTIR coupling between waveguides. While the front view 500 shows the 1-D FTIR coupling as between a first light expansion 310 in the +x direction to a second light expansion beam 505 in the +y direction, it is possible to use 1-D FTIR coupling to produce a 1-D expansion between any two vector directions. Furthermore, while the second light expansion beam 505 is shown in FIG. 5 as perpendicular to the first light expansion 315, in other embodiments the second light expansion beam 505 may propagate in the x-y plane at an angle to the first light expansion 315. For example, the second light expansion beam 505 may form a 95° angle with the first light expansion 315, and the second light expansion beam 505 thus propagates across the waveguide body 405 in the x-y plane non-perpendicularly to the TIR guide 305.

As shown in FIG. 5, the second light expansion beam 505 propagates as a beam within the waveguide body 405. The location along the x-axis of the beginning of the second light expansion beam 505 within the waveguide body 405 is determined by the location along the x-axis of the contact between TIR guide and waveguide body 510. For example, if the location of the contact between TIR guide and waveguide body 510 is 5 cm as measured from the bottom of the TIR guide 305 in the x-axis, then the second light expansion beam 505 is also 5 cm as measured from the bottom of the waveguide body 405 in the x-axis, in an embodiment in which the second light expansion beam 505 is perpendicular to the first light expansion 315. As previously described in relation to FIG. 4, it is possible to have either a single contact between TIR guide and waveguide body 510, or a plurality of contacts between TIR guide and waveguide body 510, depending on the technique used to produce deformation 415 with FTIR.

The front view 500 as shown in FIG. 5 may correspond to a front view along the z-axis of the NED 100 as described in further detail with reference to FIG. 1. Thus the first light expansion vector 125 along the edge of display 115 may be the first light expansion 310 within the TIR guide 305 as shown in FIG. 3A-5. The second light expansion beam 505 may be second light expansion vector 130 along the surface of the display 115. The waveguide body 405 as shown in FIG. 4-5 may be a planar surface within the display 115 and/or waveguide display assembly 210 as described in further detail with reference to FIG. 2.

In order to form the full exit pupil 215 and eyebox 225 as shown in FIG. 2, light is emitted from the waveguide display assembly 210 and waveguide body 405 from multiple locations along the x and y axis of the waveguide body 405, as shown in FIG. 5. Because the second light expansion beam 505 is produced from only a single point of contact between TIR guide and waveguide body 510, a plurality of contacts between TIR guide and waveguide body 510 are needed to produce a plurality of second light expansion beams 505. By covering a surface area within the x axis of the waveguide body 405 with a plurality of second light expansion beams 505, out-coupling to the full exit pupil surface 230 and eyebox 225 can be achieved. A number of different techniques may be used to produce the plurality of second light expansion beams 505.

The first technique may be to scan the contact between TIR guide and waveguide body 510 along the x axis and surface of the TIR guide 305 and/or waveguide body 405. In some examples, scanning the contact between TIR guide and waveguide body 510 includes moving the location of the deformation 415 along the length of the TIR guide 305 and/or waveguide body 405 in the x axis. In some examples, scanning the contact between TIR guide and waveguide body 510 includes changing the period of an acoustic or electrical wave used to produce the deformation 415. In some examples, scanning the contact between TIR guide and waveguide body 510 includes scanning the location of an applied voltage along the length of the TIR guide 305 and/or waveguide body 405 in the x axis.

The second technique may be to have an addressable contact between TIR guide and waveguide body 510 along the x axis and surface of the TIR guide 305 and/or waveguide body 405. The addressable contact between TIR guide and waveguide body 510 allows a second light expansion beam 505 to be output from any location along the TIR guide 305 and/or waveguide body 405. For example, in an addressable configuration, the contact between TIR guide and waveguide body 510 may be formed at a distance of 1 cm measured from the bottom of the TIR guide 305, outputting a second light expansion beam 505 along the waveguide body 405 at the corresponding height in the x axis. The next contact between TIR guide and waveguide body 510 can be formed at a distance of 6 cm measured from the bottom of the TIR guide 305, outputting the next second light expansion beam 505 along the waveguide body 405 at the corresponding second height in the x axis. In the addressable system, the contact can be formed at 1 cm and at 6 cm without forming contacts at any point in between. Thus the contact between TIR guide and waveguide body 510 may be addressable.

In some examples, forming an addressable contact between TIR guide and waveguide body 510 includes changing a period of an acoustic or electric wave used to produce the deformation 415. In some examples, addressing the contact between TIR guide and waveguide body 510 includes addressing an applied voltage at the desired location on the TIR guide 305 and/or waveguide body 405 in the x axis.

The location of the contact between TIR guide and waveguide body 510 may be determined by an eye tracker assembly. For example, the eye tracker assembly may determine the direction of a user's gaze. The direction of a user's gaze may correspond to a x-axis range over which light is output in order to provide the user with full FOV. In response, the contact between TIR guide and waveguide body 510 may be adjusted to create second light expansion beams 505 across the full x axis range in the waveguide body 405. In another example, the eye tracker assembly may determine an IPD of a user. The IPD of a user may correspond to a x-axis range over which light is output when no user eye movement is detected. In response, the contact between TIR guide and waveguide body 510 may be adjusted to create second light expansion beams 505 across the x axis range in the waveguide body 405 corresponding to the user's IPD.

The x axis range in the waveguide body 405 can directly correspond to the location of a user's pupil. Instead of delivering light over a surface of a user's eye, the output light can thus be tailored to directly deliver the image light to a user's pupil. This further improves the power efficiency of the NED, since unnecessary output light that would otherwise not make it to the retina and is reduced.

The contact between TIR guide and waveguide body 510 is thus a dynamic contact point, producing FTIR that allows the out-coupling of the second light expansion beam 505 from any location along the TIR guide 305. By scanning or addressing the contact between TIR guide and waveguide body 510, the plurality of second light expansion beams 505 that result are each of the same flux, since the FTIR of the TIR guide 305 results in the same output of light and coupling between TIR guide 305 and waveguide body 405. In comparison, conventional techniques using an output grating have variable output flux since as the light moves along the TIR guide 305 and is gradually output into the waveguide body 405, the amount of light remaining in the TIR guide 305 gradually reduces, leading to lower flux further away from the location of the input coupler 315, as described in further detail with reference to FIG. 3A and 3B. Furthermore, conventional grating techniques for coupling light between the TIR guide 305 and the waveguide body 405 are static, and determined by the fixed location of the output grating. In contrast, dynamic FTIR allows for the light output to a user's eye to be adjusted based on a variable parameter, such as a user's gaze or a user's IPD.

The 1-D FTIR coupling described in FIG. 3A-5 produces first light expansion vector 125 and second light expansion vector 130, as described in further detail with reference to FIG. 1. In order to convey the light field to a user's eye from the waveguide body 405, a third light expansion is needed. This is the output beam 110 as described in further detail with reference to FIG. 1. Multiple embodiments may produce output beam 110 from the 1-D FTIR coupling described in FIG. 3A-5. One example is described below with reference to FIG. 6, which corresponds to 1-D FTIR to produce output beam 110. A second example is described below with reference to FIG. 7-8, which corresponds to 2-D FTIR to produce output beam 110.

Figure 6:
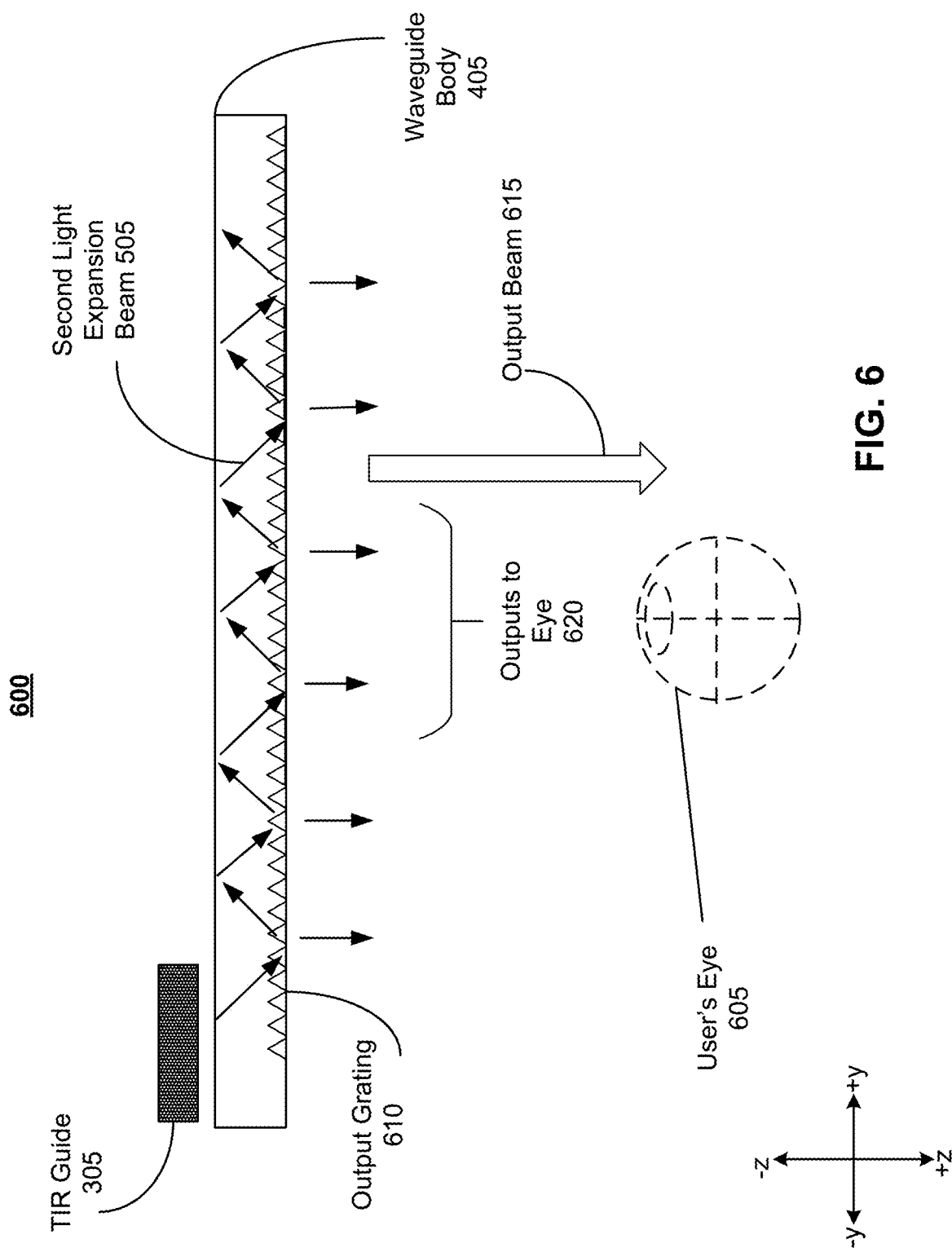
FIG. 6 is an overhead view of a first out-coupling of a waveguide body in a third light expansion directed to the user's eye, in accordance with one or more embodiments.

FIG. 6 is an overhead view 600 of a first out-coupling of a waveguide body 405 in a output beam 615 directed to the user's eye 605, in accordance with one or more embodiments. FIG. 6 shows an embodiment of FTIR coupling that allows for dynamic adjustment of the second light expansion beam 505 in the x axis, but has a static out-coupling range in the y axis. This static out-coupling is determined by the location of the output grating 610 in the y axis of the waveguide body 405. Thus FIG. 6 corresponds to 1-D dynamic FTIR coupling to produce the output beam 615. Output beam 615 is the output beam 110 as described in further detail with reference to FIG. 1. The second light expansion beam 505 is generated from the input beam 325 as described in further detail with reference to FIG. 3A-5.

The pitch of the output grating 610 is chosen to cause incident image light to exit the waveguide body 405. For example, the pitch of the output grating 610 may be in the range of 100 to 800 nm. The pitch of the output grating 610 may vary across the length of the waveguide body 405 to ensure that as light is out-coupled from the waveguide body 405 away from the input of the TIR guide 305, the flux of the outputs to eye 620 are constant. Thus the output coupling efficiency of the output grating 610 may increase across the length of the waveguide body 405 in the +y direction. The outputs to eye 620 produced by the second light expansion beam 505 incident on the output grating 610 together produce the output beam 615, which conveys the light field to the user's eye 605. The dimensions of the exit pupil 215 as shown in FIG. 6 are thus dependent on the variable x-axis range produced by out-coupling light from the TIR guide 305 with FTIR, and the static y-axis range determined by the position of the output grating 610 in the waveguide body 405. Because the coupling between the TIR guide 305 and the waveguide body 405 is produced with FTIR, the example shown in FIG. 6 is still an energy efficient replacement of conventional EPE techniques, and allows for a variable adjustment of the x-axis range of the output beam 615.

Figure 7:
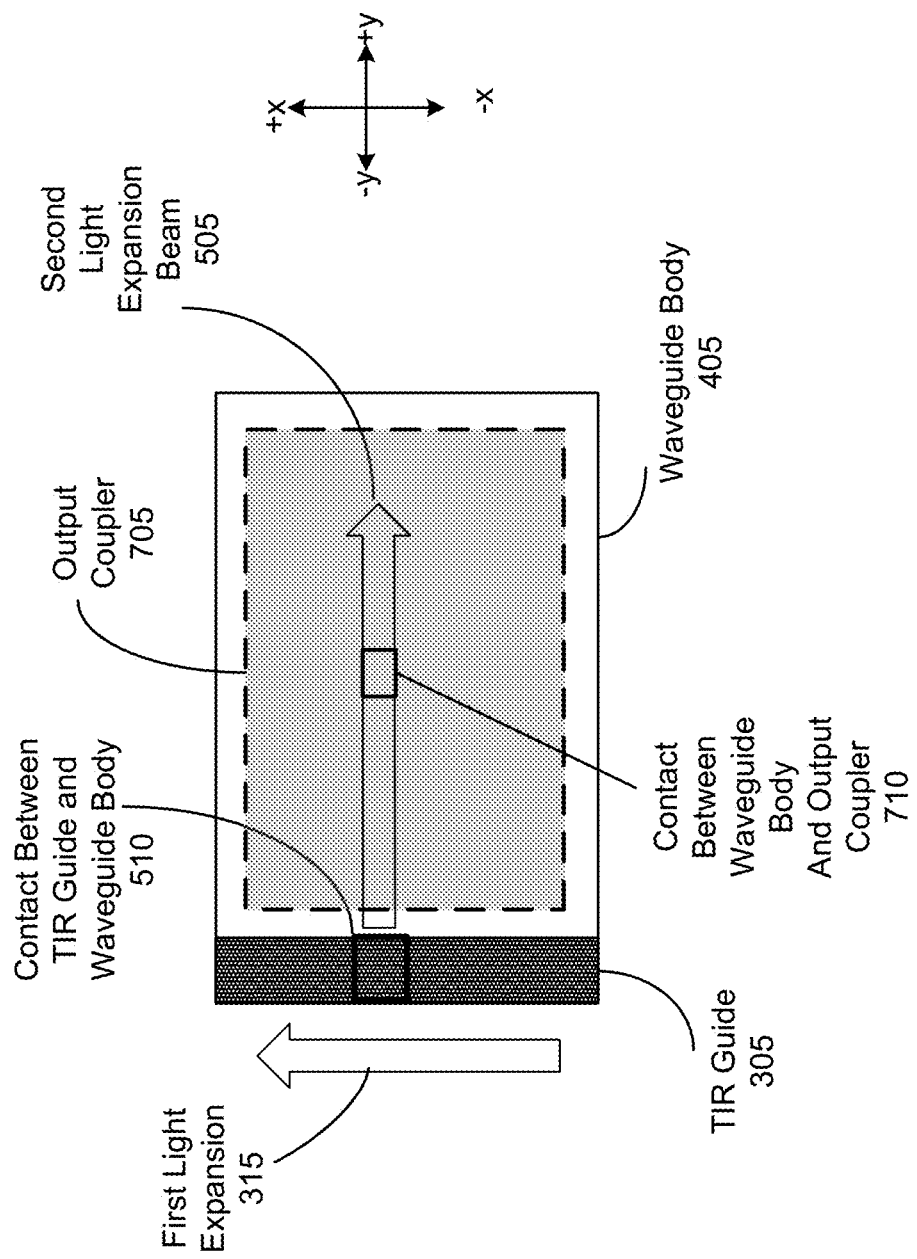
FIG. 7 is a front view of a first light expansion in the first waveguide and a second light expansion in the waveguide body, and a second coupling via FTIR, in accordance with one or more embodiments.

FIG. 7 is a front view 700 of a first light expansion 310 in the first waveguide 305 and a second light expansion 505 in the waveguide body 405, and a second coupling via FTIR, in accordance with one or more embodiments. FIG. 7 shows a 2-D dynamic FTIR coupling, allowing for dynamic adjustment of the output beam 110 in both the x and y axis of the x-y plane of the display 115 of the NED 100 as described in further detail with reference to FIG. 1.

To provide 2-D dynamic FTIR coupling, an output coupler 705 is added to the configuration shown at FIG. 5. The coupling between the first light expansion 310 and second light expansion beam 505 is the same as described with reference to FIG. 3A-5. The addition of the output coupler 705, however, provides a second coupling interface through which FTIR transfers the second light expansion beam 505 to the output beam 110 as shown in FIG. 1.

The output coupler 705 is a planar waveguide located behind the waveguide body 405 in the z axis, such that the output coupler 705 is located closer to a user's eye behind second light expansion beam 505 than the waveguide body 405. The output coupler may be the same refractive index as the waveguide body 405, allowing for potentially 100% efficient energy transfer of the light field between the waveguide body 405 and the output coupler 705. The output coupler 705 transfers the second light expansion beam 505 to the output beam 110 at a dynamically located contact, shown as the contact between waveguide body and output coupler 710. The contact between waveguide body and output coupler 710 is located at any point in the y axis along the length of the second light expansion beam 505. The contact between waveguide body and output coupler 710 couples light in FTIR between the second light expansion beam 505 and the output beam 110.

The contact between TIR guide and waveguide body 510 is thus a dynamic contact point, producing FTIR that allows the out-coupling of the second light expansion beam 505 from any location along the TIR guide 305. By scanning and/or addressing the contact between TIR guide and waveguide body 510 (as described in further detail with reference to FIG. 8), the plurality of second light expansion beams 505 that result are each of the same flux, since the FTIR of the TIR guide 305 results in the same output of light and coupling between TIR guide 305 and waveguide body 405. The location of the contact between waveguide body and output coupler 710 may be dynamically adjustable, such that the position of the output beam 110 in the y axis of the waveguide body 405 is controllable.

The location of contact between waveguide body and output coupler 710 may be determined by an eye tracking system. For example, the eye tracking system may determine the direction of a user's gaze. In response, the location of the contact between waveguide body and output coupler 710 is adjusted along the y axis, and along the length of the second light expansion beam 505. The location of the contact between waveguide body and output coupler 710 may thus be selected to dynamically position an exit pupil 215 and eye box 220 over a user's eye 205 in response to movements of the user's gaze and user's eye 205, as described in further detail with reference to FIG. 2.

In some examples, the location of the contact between TIR guide and waveguide body 510 and the location of the contact between waveguide body and output coupler 710 may be synched, such that the x coordinate of the contact between waveguide body and output coupler 710 is determined by the height along the TIR guide 305 the contact between TIR guide and waveguide body 510 is located. Thus the contact between waveguide body and output coupler 710 is located along the second light expansion beam 505, whose location is determined by the contact between TIR guide and waveguide body 510.

The contact between waveguide body and output coupler 710 frustrates TIR of the second light expansion beam 505 propagating in the waveguide body 405. The FTIR of the contact between waveguide body and output coupler 710 is described in further detail with reference to FIG. 8.

Figure 8:
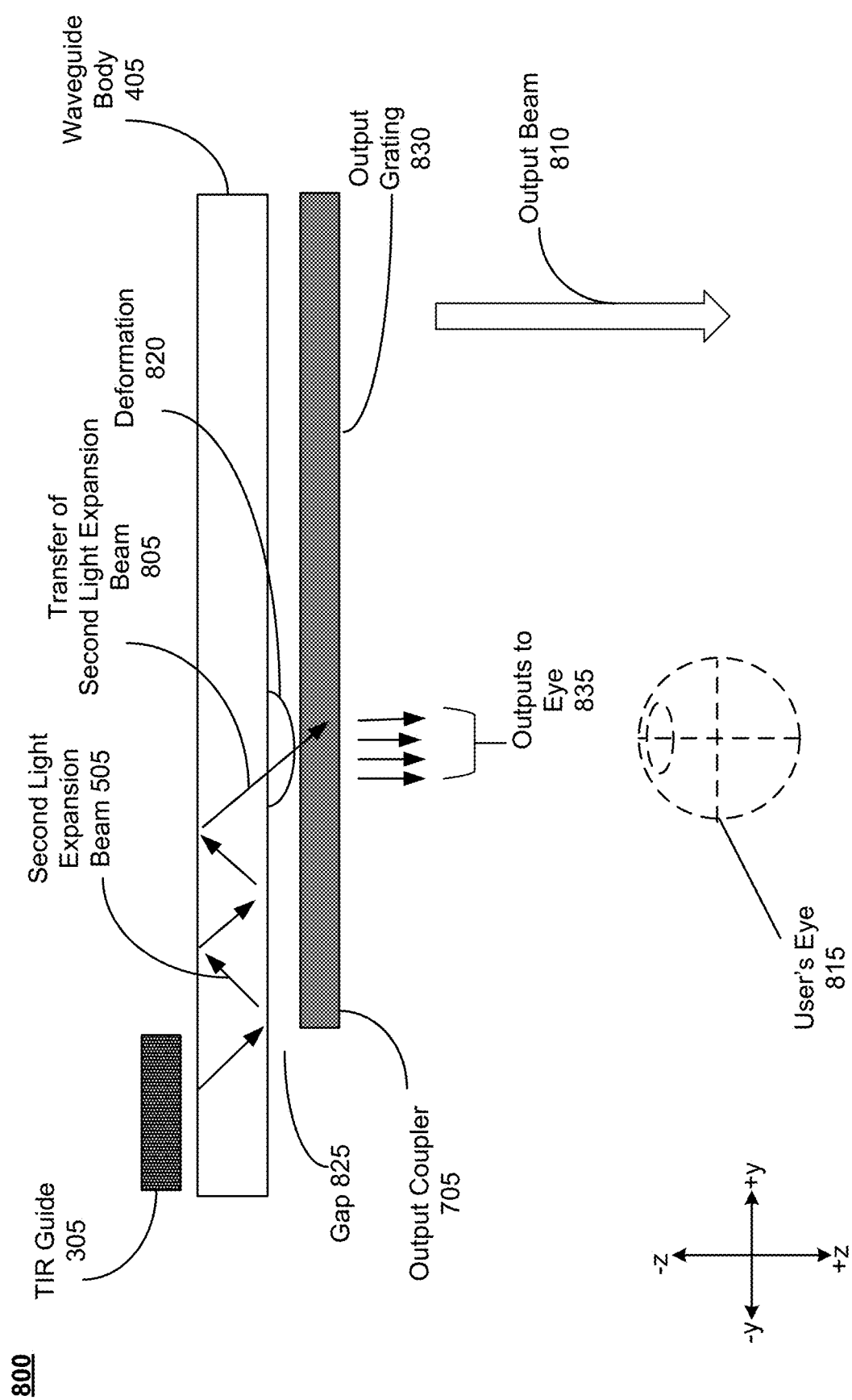
FIG. 8 is an overhead view of a second out-coupling of the waveguide body with an output coupler in a third light expansion directed to a user's eye, in accordance with one or more embodiments.

FIG. 8 is an overhead view 800 of a second out-coupling of the waveguide body 405 with an output coupler 705 in a output beam 810 directed to a user's eye 815, in accordance with one or more embodiments.

The second light expansion beam 505 is transferred from the TIR guide 305 as described above with reference to FIG. 3A-5. The output coupler 705 is a planar waveguide parallel to the waveguide body 405, as described with reference to FIG. 7. The deformation 820 corresponds to the contact between waveguide body and output coupler 710. The deformation 820 interrupts the TIR of the second light expansion beam 505 within the waveguide body 405, causing the transfer of second light expansion beam 805 from the waveguide body 405 to the output coupler 705.

When the light field is out-coupled from TIR guide 305 into the waveguide body 405, the light field is bent via a grating (not shown) that alters the direction of the first light expansion 310 and expands light in the waveguide body 405 at a diffraction angle that is greater than a critical angle. The grating may be located on the TIR guide 305 and/or the waveguide body 405. In some examples, a prism coupler located on the TIR guide 305 and/or the waveguide body 405 bends the light field from the TIR guide 305 at a diffraction angle greater than a critical angle. Any other technique may be used to ensure that the second light expansion beam 505 expands in the +y direction in the waveguide body 405 in TIR.

A gap 825 is maintained between the waveguide body 405 and the output coupler 705. The gap 825 is of a material whose refractive index is less than that of the waveguide body 405 and the output coupler 705. Gap 825 allows the second light expansion beam 505 to propagate within the waveguide body 405 in TIR, since it provides an interface with the waveguide body 405 of a lower refractive material. The gap 825 acts as a potential barrier that prevents the second light expansion beam 505 from exiting the waveguide body 405. In some examples, gap 825 is an air gap. In some examples, the gap is approximately 5 µm. Alternatively, gap 825 is maintained by a material of lower refractive index than the waveguide body 405 and the output coupler 705. As long as the gap 825 is maintained, the second light expansion beam 505 continues to propagate within the waveguide body 405 without significant loss of energy.

However, at deformation 820, the gap 825 is interrupted, causing a localized reduction in the space between the waveguide body 405 and output coupler 705. As described in relation to Equation 1, while the second light expansion beam 505 conveys a light field across the waveguide body 405 without significant loss of energy, there is a non-propagating evanescent field that develops at the material boundary of the waveguide body 405, and penetrates a depth d into the lower index of refraction material external to the waveguide body 405. The penetration depth d is shown in Equation 1. If the distance between the waveguide body and the output coupler 705 is reduced from the size of the gap 825 to be less than or equal to the penetration depth d of the evanescent field formed external to the waveguide body 405, then the second light expansion beam 505 is transferred by the evanescent field at deformation 820 from the waveguide body 405 to the output coupler 705 through the transfer of second light expansion beam 805. The transfer of second light expansion beam 805 is thus FTIR since it interrupts the propagation of the light field in TIR and out-couples light into the output coupler 705. In some examples, the deformation 820 physically contacts the output coupler 705. In other examples, the deformation 820 reduces the distance between the waveguide body 405 and the output coupler 705 to a distance greater than 0 and less than or equal to the distance d given by Equation 1. The contact between waveguide body and output coupler 710 is the point along the waveguide body 405 at which the deformation 820 is formed and the second light expansion beam 505 is transferred to the output coupler 705. The contact between waveguide body and output coupler 710 may refer to a physical contact between the waveguide body 405 and the output coupler 705. In other examples, the contact between waveguide body and output coupler 710 refers to the point along the waveguide body 405 at which the distance between the waveguide body 405 and the output coupler 705 is reduced to be greater than 0 and less than or equal to the distance d given by Equation 1. In other examples, the contact between waveguide body and output coupler 710 refers to the point along the waveguide body 405 at which transfer of second light expansion beam 805 occurs.

As shown in FIG. 8, the deformation 820 is formed on the waveguide body 405. Additionally or alternatively, the deformation 820 may be formed on the output coupler 705. For example, a deformation 415 may be formed both on the waveguide body 405 and on the output coupler 705, resulting in the transfer of second light expansion beam 805. In other examples, a deformation 820 may be formed only on the output coupler 705, resulting in the transfer of second light expansion beam 805.

The transfer of second light expansion beam 805 through the FTIR produced by the deformation 820 is highly energy efficient. If the waveguide body 405 has the same refractive index as the output coupler 705, the transfer of second light expansion beam 805 may be close to 100% efficient. This means that all of the light field propagating in TIR in the waveguide body 405 may be transferred to the output coupler 705.

The deformation 820 for FTIR may be produced using a variety of techniques. In some examples, the deformation 820 is a physical deformation in the surface of the waveguide body 405 and/or the output coupler 705. However, in other examples, the deformation 820 is a location at which the refractive index of the waveguide body 405 is effectively changed, such that the incident light within the waveguide body 405 no longer satisfies the conditions for TIR at the location of the deformation 820. Selectively and dynamically changing the refractive index of the waveguide body 405 may be accomplished using a variety of techniques. For example, the deformation 820 may be created using an acousto-optic modulator (AOM). In this example, the deformation 820 is not, in fact, a physical deformation, but instead represents a location on the waveguide body 405 at which the refractive index has been effectively altered by the sound waves produced by the piezoelectric transducer of the AOM. In some examples of AOM FTIR, the deformation 820 and resulting transfer of second light expansion beam 805 occurs at periodic locations along the waveguide body 405 corresponding to the period of the sound wave produced by the AOM. Thus a plurality of deformations 805 and a plurality of transfer of second light expansion beams 805 may occur along the waveguide body 405. Alternatively, the AOM may produce a single deformation 820 and a single transfer of second light expansion beam 805.

In another example in which the deformation 820 is caused by selectively and dynamically changing the refractive index of the waveguide body 405, the waveguide body 405 itself may be formed from a material whose index of refraction can be altered in response to an input, such as in plasmonic coupling. In some examples, graphene layers may be located on either side of the gap 825, such that a graphene layer is located on the waveguide body 405 and a second graphene layer is located on the output coupler 705. An applied voltage alters the chemical potential of the graphene layers, resulting in graphene assisted FTIR, which is described in further detail with reference to FIG. 4.

In another example, the back surface of the waveguide body 405 facing the output coupler 705 and in contact with the gap 825 may include a layer of an electro-statically charged liquid. Additionally or alternatively, the front surface of the output coupler 705 facing the waveguide body 405 and in contact with the gap 825 may include a layer of an electro-statically charged liquid. In this example, liquid that deforms in response to an applied voltage creates deformation 820, which does not change the shape of the waveguide body 405 and/or the output coupler 705 itself. Rather, the deformation 820 is a droplet of electrostatically charged liquid that forms from the liquid's surface in response to an applied voltage. The deformation 820 of liquid thus does in fact physically reduce the gap 825 between the waveguide body 405 and the output coupler 705, producing the transfer of second light expansion beam 805. In some examples, the deformation 820 may be formed on the output coupler 705. In some examples in which electrostatically charged liquid is located on the surface of both the waveguide body 405 and the output coupler 705, the deformation 820 is a capillary bridge between the two liquids, thus producing physical contact between the waveguide body 405 and the output coupler 705 and reducing the gap 825 to a distance of 0 at the location of the deformation 820.

Any other technique for producing FTIR and creating transfer of second light expansion beam 805 may be used. While FIG. 8 shows a single deformation 820 and a single transfer of second light expansion beam 805, a plurality of deformations 805 and a plurality of transfers of second light expansion beam 810 may be produced to form the output beam 810.

Following the transfer of second light expansion beam 805 from the waveguide body 405 to the output coupler 705, the output coupler outputs the light field through an output grating 830. The output grating 830 out-couples the light field as outputs to eye 835. The pitch of the output grating 830 is chosen to cause incident image light to exit the output coupler 705. For example, the pitch of the output grating 830 may be in the range of 100 to 800 nm. The outputs to eye 835 together form the output beam 810.

The deformation 820 is located within the x-y plane of the waveguide body 405 and/or the output coupler 705. The x-coordinate of the deformation 820 is determined by the location of FTIR between the TIR guide 305 and the waveguide body 405.

In order to form the full exit pupil 215 and eyebox 225 as shown in FIG. 2, light is emitted from the waveguide display assembly 210 and waveguide body 405 from multiple locations along the x and y axis of the waveguide body 405, as shown in FIG. 7. Because the output beam 810 is localized to the location of the deformation 820, a plurality of deformations 805 are needed to produce a plurality of third light expansions 830. By covering a surface area within the y axis of the waveguide body 405 with a plurality of third light expansions 830, out-coupling to the full exit pupil surface 230 and eyebox 225 can be achieved. When used with an eye-tracking system, the location of the out-coupling to the full exit pupil surface 230 and eyebox 225 can be adjusted to the location of a user's gaze, thus selectively illuminating portions of the eyebox 225. A number of different techniques may be used to produce the plurality of third light expansions 830.

The first technique may be to scan the deformation 820 along the y-axis and surface of the waveguide body 405 and/or output coupler 705. In some examples, scanning the deformation 820 includes changing the period of an acoustic or electrical wave used to produce the deformation 820. In some examples, scanning the deformation 820 includes scanning the location of an applied voltage along the length of the waveguide body 405 and/or output coupler 705 in the y axis.

The second technique may be to have an addressable deformation 820 along the y axis and surface of the waveguide body 405 and/or output coupler 705. The addressable deformation 820 allows an output beam 810 to be output from any location along the waveguide body 405. For example, in an addressable configuration, the deformation 820 is formed at a distance of 1 cm measured from the edge of the waveguide body 405, outputting an output beam 810 along the output coupler 705 at the corresponding length in they axis. The next deformation 820 can be formed at a distance of 6 cm measured from the edge of the waveguide body 405, outputting the next output beam 810 along the output coupler 705 at the corresponding second length in the y axis. In the addressable system, the deformation 820 can be formed at 1 cm and at 6 cm without forming deformations 805 at any point in between.

In some examples, forming an addressable deformation 820 includes changing a period of an acoustic or electric wave. In some examples, addressing the deformation 820 includes addressing an applied voltage at the desired location on the waveguide body 405 and/or output coupler 705 in the y axis.

Thus to fill the exit pupil 215 and eye box 220 with the output beam 810, a plurality of deformations 805 are formed across a range of locations along the y-axis of the waveguide body 405. Thus the dimensions of the exit pupil 215 are dependent on the variable x-axis range produced by out-coupling light from the TIR guide 305 with FTIR, and the variable y-range produced by out-coupling light from the waveguide body 405 with FTIR. Because the coupling between the first light expansion vector 125 and second light expansion vector 130, as well as the coupling between the second light expansion vector and the output beam 110 are accomplished with FTIR, the output beam 810 is highly energy efficient. The coupling described in FIG. 7 and FIG. 8 represents 2-D dynamic FTIR coupling, since both the x and y dimensions of the output beam 810 are variable.

Additional Configuration Information

The foregoing description of the embodiments of the disclosure has been presented for the purpose of illustration; it is not intended to be exhaustive or to limit the disclosure to the precise forms disclosed. Persons skilled in the relevant art can appreciate that many modifications and variations are possible in light of the above disclosure.

Some portions of this description describe the embodiments of the disclosure in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments of the disclosure may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments of the disclosure may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the inventive subject matter. It is therefore intended that the scope of the disclosure be limited not by this detailed description, but rather by any claims that issue on an application based hereon. Accordingly, the disclosure of the embodiments is intended to be illustrative, but not limiting, of the scope of the disclosure, which is set forth in the following claims.

What is claimed is:

1. A waveguide display, comprising:
   a first waveguide having a first surface and a second surface that is opposite to the first surface;
   an input coupler configured to in-couple light into the first waveguide, and the first waveguide is configured to expand the light in a first dimension to form first expanded light;
   a second waveguide having a third surface and a fourth surface that is opposite to the third surface, the second waveguide configured to in-couple the first expanded light at a first adjustable contact point between the second surface of the first waveguide and the third surface of the second waveguide, wherein the first adjustable contact point frustrates total internal reflection of light in the first waveguide to transfer the first expanded light to the second waveguide, and the second waveguide is configured to expand the first expanded light in a second dimension to form image light that is output by the second waveguide;
   an output coupler with a fifth surface and a sixth surface that is opposite the fifth surface, wherein the output coupler has a plurality of output locations on the sixth surface; and
   a second adjustable contact point between the fifth surface of the output coupler and the fourth surface of the second waveguide, wherein the second adjustable contact point frustrates total internal reflection of light in the second waveguide and transfers the light to the output coupler, and wherein the output coupler out-couples the light as the image light at an output location of the plurality of output locations.

2. The waveguide display of claim 1, wherein the first adjustable contact point is selected from a plurality of positions that are associated with a different strip of light output from the second waveguide that together illuminate an eyebox.

3. The waveguide display of claim 1, further comprising:
   an acousto-optic modulator (AOM) coupled to the second waveguide, wherein the AOM generates a position of the first adjustable contact point.

4. The waveguide display of claim 1, further comprising an addressable electro-statically charged liquid layer between the first waveguide and the second waveguide, and a location of the first adjustable contact point is based in part on applied voltages at specific addresses of the electro-statically charged liquid layer.

5. The waveguide display of claim 1, wherein the position of the first adjustable contact point is scanned along the second surface of the first waveguide.

6. The waveguide display of claim 1, wherein the position of the first adjustable contact point along the second surface of the first waveguide is addressable.

7. The waveguide display of claim 1, wherein the sixth surface of the output coupler includes a grating.

8. The waveguide display of claim 1, wherein the output location of the plurality of output locations is determined by the positions of the first adjustable contact point and the second adjustable contact point.

9. The waveguide display of claim 8, further comprising:
   an eye tracking system configured to determine a gaze direction of a user; and
   wherein the position of the first adjustable contact point is selected based on the gaze direction.

10. A near-eye display (NED) comprising:
    a first waveguide having a first surface and a second surface that is opposite to the first surface;
    an input coupler configured to in-couple light into the first waveguide, and the first waveguide is configured to expand the light in a first dimension to form first expanded light;
    a second waveguide having a third surface and a fourth surface that is opposite to the third surface, the second waveguide configured to in-couple the first expanded light at a first adjustable contact point between the second surface of the first waveguide and the third surface of the second waveguide, wherein the first adjustable contact point frustrates total internal reflection of light in the first waveguide to transfer the first expanded light to the second waveguide, and the second waveguide is configured to expand the first expanded light in a second dimension that is orthogonal to the first dimension to form image light that is output by the second waveguide to an eyebox;
    an output coupler with a fifth surface and a sixth surface that is opposite the fifth surface, wherein the output coupler has a plurality of output locations on the sixth surface; and
    a second adjustable contact point between the fifth surface of the output coupler and the fourth surface of the second waveguide, wherein the second adjustable contact point frustrates total internal reflection of light in the second waveguide and transfers the light to the output coupler, and wherein the output coupler out-couples the light as the image light at an output location of the plurality of output locations.

11. The NED of claim 10, wherein a position of the first adjustable contact point is scanned along an output surface of the first waveguide.

12. The NED of claim 10, wherein a position of the first adjustable contact point along an output surface of the first waveguide is addressable.

13. The NED of claim 12, further comprising:
    an eye tracking system configured to determine a gaze direction of a user; and
    wherein a position of the first adjustable contact point is selected based on the direction of gaze direction.

14. The NED of claim 10, wherein the output location of the plurality of output locations is determined by the positions of the first adjustable contact point and the second adjustable contact point.

15. The NED of claim 10, further comprising:
    an acousto-optic modulator (AOM) coupled to the second waveguide, wherein the AOM generates a position of the first adjustable contact point.

16. The NED of claim 10, further comprising an addressable electro-statically charged liquid layer between the first waveguide and the second waveguide, and a location of the first adjustable contact point is based in part on applied voltages at specific addresses of the electro-statically charged liquid layer.

* * * * *